(No Model.)
W. A. LINE.
DROPPING OR GAVELING ATTACHMENT FOR HARVESTERS.
No. 500,402. Patented June 27, 1893.
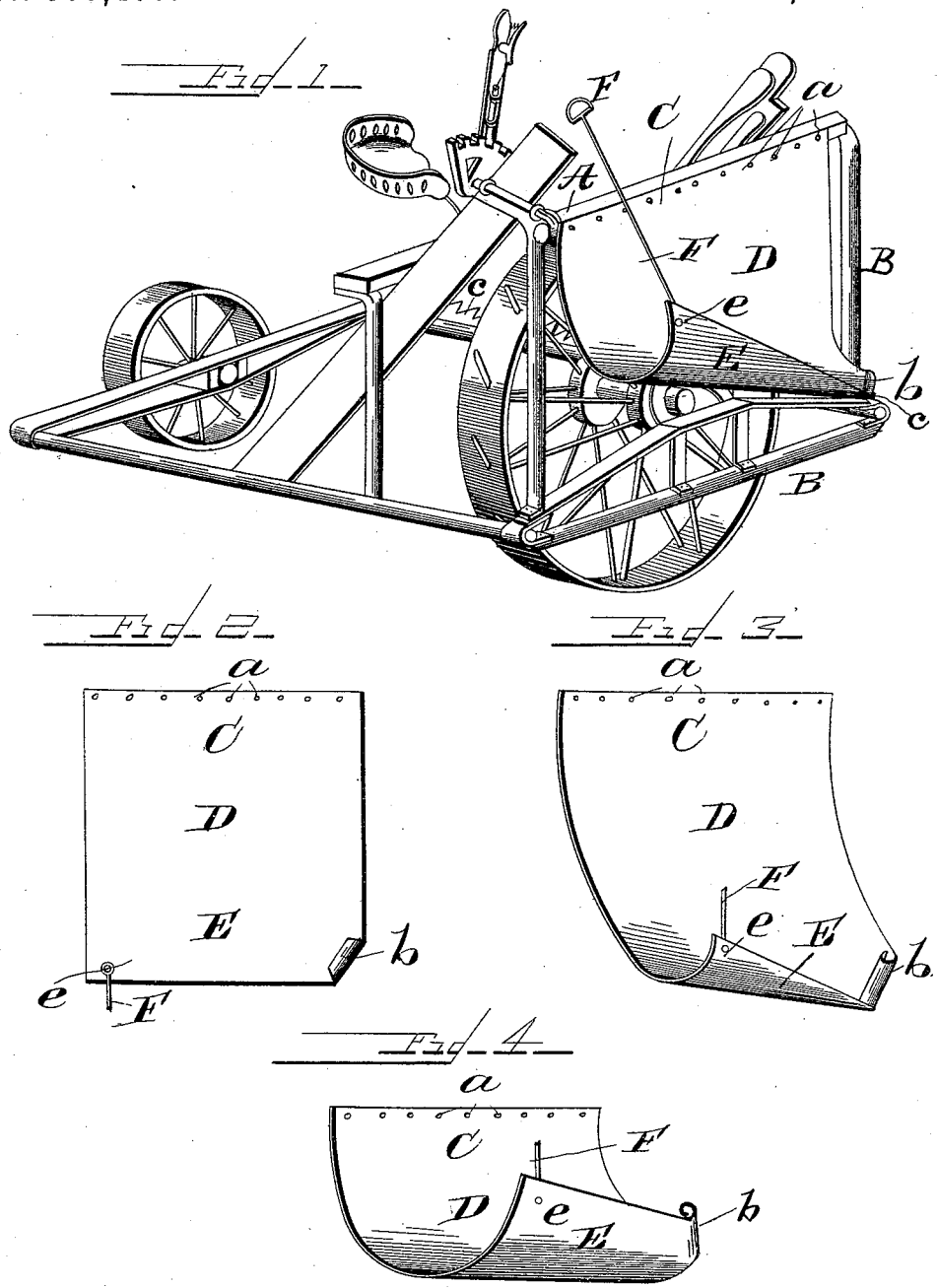
Witnesses
A. L. Watson
W. O. Crosby
Inventor
William A. Line
By C. J. Belt
Attorney
THE NORRIS PETERS CO., PHOTO-LITHO., WASHINGTON, D. C.

UNITED STATES PATENT OFFICE.

WILLIAM A. LINE, OF CARLISLE, PENNSYLVANIA.

DROPPING OR GAVELING ATTACHMENT FOR HARVESTERS.

SPECIFICATION forming part of Letters Patent No. 500,402, dated June 27, 1893.

Application filed May 17, 1892. Serial No. 433,273. (No model.)

*To all whom it may concern:*

Be it known that I, WILLIAM A. LINE, a citizen of the United States, residing at Carlisle, in the county of Cumberland and State of Pennsylvania, have invented certain new and useful Improvements in Dropping or Gaveling Attachments for Harvesters, of which the following is a specification.

This invention relates to a gaveling or dropping attachment for harvesters, and its novelty will be fully understood from the following description and claims when taken in connection with the accompanying drawings; and the object of the invention is to construct a dropper of sheet metal adapted to be rolled upon itself so as to form inclined grain receptacles of varying dimensions.

A further object of the invention is to provide a harvester with a gaveling device or dropper, which can be operated from the harvester seat to form grain receptacles of varying dimensions.

The invention consists in the novel construction and arrangement of the dropper.

In the accompanying drawings forming part of this application, Figure 1 is a perspective view of a harvester without its gearing with my improved dropper attached to the frame thereof. Fig. 2 is a plan view of the dropper with the hand lever attached thereto. Fig. 3 is a front view of the dropper rolled to form a smaller grain receptacle than that shown in Fig. 1. Fig. 4 is a similar view showing the dropper rolled to form a grain receptacle larger than that shown in Fig. 1.

The same letters of reference denote the same parts in the several figures of the drawings.

The harvester shown, forms no part of my invention, and therefore the harvester frame and the cutting blades will only be referred to in the following description and claims.

To the top beam A, of the harvester frame B, is secured, by set screws or rivets a, one end C, of the dropper D, leaving its other or free end E, capable of being rolled upon itself. This free end E, hangs down at the end of the harvester outside of the frame B; its lower front corner being curled upon itself at b, and having its unchanged position on a line with the cutting blades c. The curled portion b prevents the grain from sliding out of the dropper, and allows the rear portion of the free end to be rolled up diagonally from the said curled portion b. To the rear lower end e, of the free end E, is secured an operating rod E F, which extends over the top beam A in convenient reach of the operator from the harvester seat.

Inclined grain receptacles of different size and depth are produced at will by the harvester operator, as occasion may require, by his raising and lowering the operating rod, which respectively rolls and unrolls the free end of the dropper, diagonally from the curled portion b. By the foregoing described construction and operation of the dropper, the grain is held in the swather, controlled by the operator in his seat, and dropped to the ground at his own discretion, by dropping the rod F sufficient to allow the portion E to unroll to the extent shown in Fig. 3, when the grain is delivered to the ground over the edge of the said portion E.

Having thus described my invention, what I claim as new, and desire to secure by Letters Patent, is—

1. A dropper composed of a single piece of sheet metal secured to a harvester frame having its front lower corner curled upon itself, and its lower rear corner left free to be rolled up diagonally from said curled portion, so as to form an inclined grain receptacle, in combination with means for rolling the said dropper upon itself substantially as and for the purpose set forth.

2. The combination with a harvester, of a dropper consisting of a single piece of sheet metal having one end secured to the harvester frame, and its other end left free, part of said free end adapted to be rolled up toward the secured end, whereby the inclined receptacle may be varied in size, substantially as and for the purpose set forth.

3. The combination with a harvester, of the dropper formed from one piece of sheet metal and having a curled front corner, and the hand rod attached to the rear free corner of the dropper, whereby the said free corner is rolled upon the body of the dropper to form an inclined grain receptacle, substantially as and for the purpose set forth.

In witness whereof I hereunto set my hand in the presence of two witnesses.

WILLIAM A. LINE.

Witnesses:
 JAMES W. ECKELS,
 J. A. MEANS.